US009396657B1

(12) United States Patent
Bauer et al.

(10) Patent No.: US 9,396,657 B1
(45) Date of Patent: Jul. 19, 2016

(54) PREDICTION OF TRAFFIC SIGNAL STATE CHANGES

(71) Applicant: Traffic Technology Solutions, LLC, Beaverton, OR (US)

(72) Inventors: Thomas Bauer, Beaverton, OR (US); Jingtao Ma, Portland, OR (US); Kyle Zachary Hatcher, Portland, OR (US)

(73) Assignee: Traffic Technology Solutions, LLC, Beaverton, OR (US)

( * ) Notice: Subject to any disclaimer, the term of this patent is extended or adjusted under 35 U.S.C. 154(b) by 169 days.

(21) Appl. No.: 14/252,491

(22) Filed: Apr. 14, 2014

Related U.S. Application Data

(60) Provisional application No. 61/811,655, filed on Apr. 12, 2013.

(51) Int. Cl.
*G05D 1/00* (2006.01)
*G05D 3/00* (2006.01)
*G06F 7/00* (2006.01)
*G06F 17/00* (2006.01)
*G08G 1/0967* (2006.01)
*G08G 1/0962* (2006.01)

(52) U.S. Cl.
CPC .... *G08G 1/096775* (2013.01); *G08G 1/096725* (2013.01); *G08G 1/09626* (2013.01); *G08G 1/096716* (2013.01); *G08G 1/096741* (2013.01)

(58) Field of Classification Search
CPC ................ G08G 1/052; G08G 1/0962; G08G 1/096716; G08G 1/096708; G08G 1/096725; G08G 1/096741; G08G 1/096775; G01C 21/36; G06K 9/00818; G06K 9/00825; G06K 9/008256
USPC ........ 701/1, 2, 70, 22, 93; 340/929, 901, 905, 340/907, 917
See application file for complete search history.

(56) References Cited

U.S. PATENT DOCUMENTS 6,989,766 B2 * 1/2006 Mese ............... G08G 1/096716 340/907
8,761,991 B1 * 6/2014 Ferguson ............. G05D 1/0088 340/917

(Continued)

FOREIGN PATENT DOCUMENTS

WO 2011019445 2/2011
WO 2011163006 12/2011
WO 2013109472 7/2013

OTHER PUBLICATIONS

Maile M. et al., Cooperative Intersection Collision Avoidance System or Violations (CICAS-V) for Avoidance of Ciolation-Based Intersection Crashes, Mercedes-Benz Research and Development North America, Inc. USA, Paper No. 09-0118, 2009, fourteen pages [online] [retrieved Jun. 5, 2012] retrieved from the Internet URL http://nrd.nhtsa.dot.gov/pdf/esv/es21/09-0118.pdf.

(Continued)

*Primary Examiner* — Jason Holloway
*Assistant Examiner* — Rachid Bendidi
(74) *Attorney, Agent, or Firm* — Schwabe, Williamson & Wyatt P.C.

(57) ABSTRACT

Methods and systems are disclosed for predicting the state and/or upcoming state changes of a traffic control signal. The traffic control signal may be an upcoming traffic control signal along a route of a motor vehicle. The prediction information may communicated to a prediction display made available to a driver or passenger in such a motor vehicle.

28 Claims, 9 Drawing Sheets

Prediction System

Single Process

(56) References Cited

U.S. PATENT DOCUMENTS

| | | | | |
|---|---|---|---|---|
| 9,043,138 | B2 | 5/2015 | Ginsberg | |
| 2006/0009188 | A1* | 1/2006 | Kubota | G08G 1/096725 455/344 |
| 2007/0027583 | A1 | 2/2007 | Tamir | |
| 2009/0070031 | A1 | 3/2009 | Ginsberg | |
| 2011/0037618 | A1 | 2/2011 | Ginsberg | |
| 2011/0037619 | A1 | 2/2011 | Ginsberg | |
| 2011/0040621 | A1 | 2/2011 | Ginsberg | |
| 2011/0093178 | A1* | 4/2011 | Yamada | G08G 1/096716 701/70 |
| 2011/0115646 | A1* | 5/2011 | Matsumura | G08G 1/096716 340/907 |
| 2012/0139754 | A1 | 6/2012 | Ginsberg | |
| 2012/0139755 | A1 | 6/2012 | Ginsberg | |
| 2012/0179358 | A1 | 7/2012 | Chang | |
| 2012/0274481 | A1 | 11/2012 | Ginsberg | |
| 2013/0076538 | A1* | 3/2013 | Uno | G08G 1/096716 340/905 |
| 2013/0131980 | A1 | 5/2013 | Ginsberg | |
| 2013/0166109 | A1* | 6/2013 | Ginsberg | G08G 1/0967 701/2 |
| 2013/0297124 | A1* | 11/2013 | Be | G06F 17/00 701/22 |
| 2014/0032089 | A1* | 1/2014 | Aoude | G08G 1/00 701/117 |
| 2014/0046509 | A1* | 2/2014 | Otake | G08G 1/095 701/2 |
| 2014/0277986 | A1* | 9/2014 | Mahler | G06F 7/00 701/93 |
| 2015/0046055 | A1* | 2/2015 | Yamada | G08G 1/096716 701/70 |

OTHER PUBLICATIONS

Aoude G. et al.; Behavior Classification Algorithms at Inersections and Validation using Naturalistic Data; Jul. 2011; six pages [online] [retrieved Jun. 5, 2012] URL http://acl.mit.edu/papers/IV11AoudeDesarajuLaurensHow.pdf.

Gminsidenews.com; DCS Preps Safety System to Previent Red-Light Running; Jun. 18, 2006, eleven pages [-online] [retrieved Jan. 23, 2012] retrieved from the internet http://www.gminsidenews.com/forums/f58/dcx-preps-safety-system-prevent-red-light-running-32921.

Faezipour, M et al.; Progress and Challenges in Intelligent Vehicle Area Networks; Communication of the ACM, Feb. 2012; pp. 90-100, vol. 55, No. 2.

Strauss S., Traffic Magic, University Affairs, Dec. 7, 2009, [online] [retrieved Aug. 17, 2010] retrieved from the internet URL http://www.universityaffairs.ca/Print.aspx?id=7102.

Vaughan Inman and Gregory Davis; The Effects of In-Vehicle and Infrastructure-Based Collision Warnings at Signalized Intersections; US Department of Transportation, Federal Highway Administration; Publication No. FHWA-HRT-09-049; Dec. 2009 (46 pages).

* cited by examiner

Prediction System

Prediction Timeline

Prediction Timeline

PREDICTION OF TRAFFIC SIGNAL STATE CHANGES

RELATED APPLICATIONS

This application in a non-provisional of U.S. provisional application No. 61/811,655 filed on Apr. 12, 2013 and incorporated herein by this reference.

COPYRIGHT NOTICE

© 2013-2014 Thomas Bauer. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This disclosure pertains to motor vehicles and to electric traffic signals of the sort commonly found at street intersections, freeway ramps, and the like, for directing vehicular traffic.

BACKGROUND

It has been suggested that predicting traffic signal changes would be useful. For example, Ginsberg refers to predicting a likely remaining duration of the traffic signal in a particular state; see U.S. Pat. App. Pub. No. 2013/0166109. The need remains, however, for a practical and effective solution to generating predictions of future traffic signal state changes.

DETAILED DESCRIPTION

Figure 1:
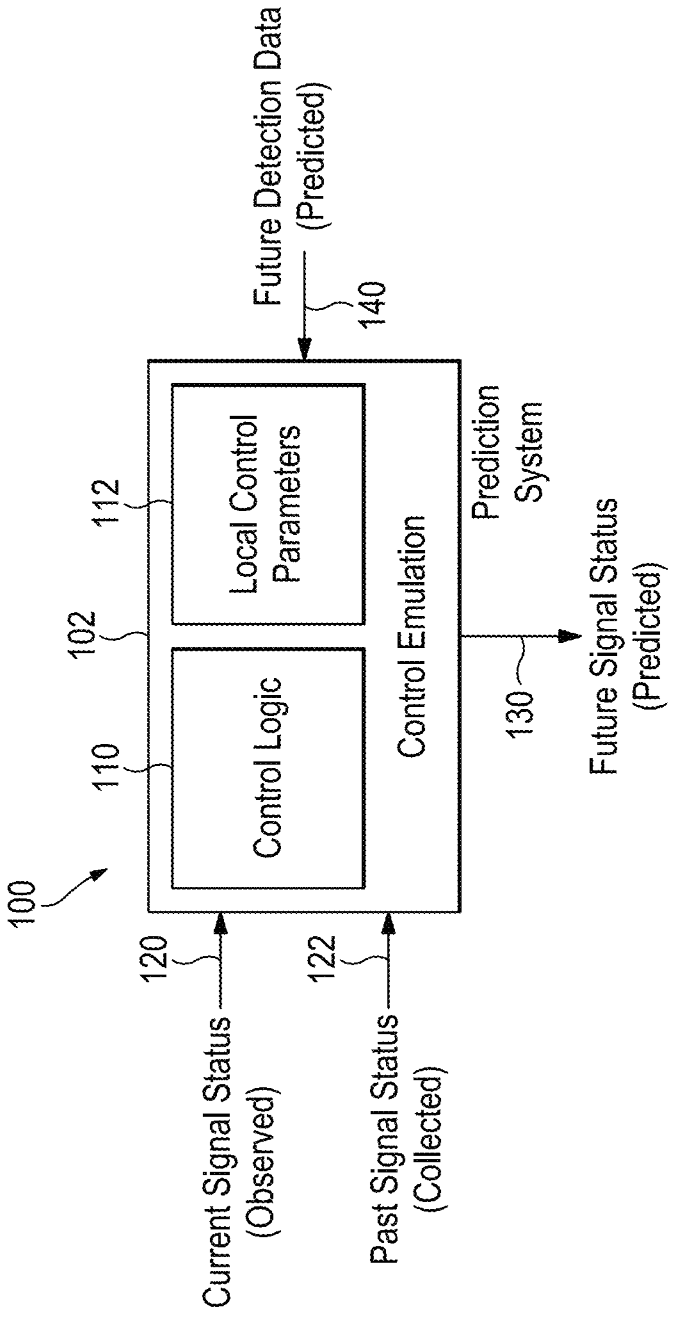
FIG. 1 is a simplified conceptual diagram of a traffic control prediction system.

Glossary: Some of the terms used herein may be defined as follows.

Traffic Signal or simply "Signal". Refers to a set of traffic control devices generally deployed at a single street intersection, highway ramp or other location. A traffic signal is controlled by an associated Field Signal Controller ("FSC").

Field Signal Controller ("FSC"). Refers to a controller, generally comprising electronics and/or software, arranged to control a Traffic Signal. The Field Signal Controller may be located at or near the corresponding Traffic Signal location, such as a street intersection, or at a central traffic management center, or some combination of the two. An FSC may operate according to various rules, algorithms, and inputs, depending on the location and circumstances of the signal it controls. For example, raw inputs may be provided to the FSC by a Detector.

Field Signal Controller State. Refers to the state of an FSC, for example, the status of one or more internal timers, and the state or status of one more Indicators controlled by the FSC. The FSC has a given state at a specific time.

Cycle Time. An FSC may change state according to a Cycle Time, although the cycle time may not always be constant. For example, a weekday cycle time may differ from a weekend cycle time for a given FSC.

Detector. Refers to an electrical, magnetic, optical, video or any other sensor arranged to provide raw input signals to an FSC in response to detection of an entity such as a motor vehicle, transit vehicle, bicycle or pedestrian. The input signal may correspond to the arrival, presence, or departure of the vehicle. A detector also may be activated manually, for example, by a pedestrian or a driver pressing a button. Of course, a detector also may be initiated remotely or wirelessly, similar to a garage or gate opener. In general, Detectors provide raw inputs or stimuli to an FSC.

Controller Emulator. Is discussed in more detail below, but in general may comprise computer hardware or other electronics, and/or software, wherever located, that is arranged to mimic or emulate the operation of an FSC.

Indicator. Refers to one or more signal lights or other visible and/or audible indicators arranged to direct or inform a user such as a motor vehicle driver, bicyclist, pedestrian, or transit vehicle operator at or near a given traffic signal location. A common Indicator for motor vehicles is the ubiquitous Green-Yellow-Red arrangement of lights. Typically an Indicator is triggered or otherwise controlled by the FSC associated with the signal location.

Prediction. Discussed in more detail below; in general, a Controller Emulator may be implemented as part of a system to predict the future behavior of a Field Signal Controller, and more specifically, to predict the specific types and timing of a field signal controller future state change.

Some traffic signals operate on a fixed schedule, while some others are "actuated" or may be adaptive to various conditions. Embodiments of the present invention may be used with all types of non-fixed time signals."

Connecting vehicles to the traffic signal infrastructure is a new concept that promises to reduce fuel consumption and save time. We described herein various methods and apparatus to accomplish this functionality. The embodiments described below are not intended to limit the broader inventive concept, but merely to illustrate it with some practical implementations. The ongoing improvements in related technologies, such as cloud computing, wireless data communications, vehicle head units, video, etc. will enable further embodiments in the future that may not be apparent today, but nonetheless will be equivalent variations on our disclosure, perhaps leveraging newer technologies to improve speed, lower cost, etc. without departing from our essential inventive concept.

Some communication infrastructure is necessary to deliver various "signal data" (for example, states, timers or predictions) into a (potentially moving) vehicle in real-time. Preferably, the vehicle (or its operator) not only is informed about the current status of the signal, but also what the signal is going to do in the near-term future. Predictions of traffic control signal status and or changes can be utilized to advantage by a vehicle control system, either autonomously or with driver participation. Predictions of traffic control signal status and or changes can be utilized by a vehicle operator independently of a vehicle control system. One important aspect of the following discussion is to describe how to create traffic signal predictions and deliver them to a vehicle/driver in a timely and useful manner.

Predictions of traffic control signal status and or changes may be delivered to a vehicle in various ways, for example, using the wireless telecom network, Wi-Fi, Bluetooth or any other wireless system for data transfer. Any of the above communication means can be used for communication to a vehicle, for example, to a "head unit" or other in-vehicle system, or to a user's portable wireless device, such as a tablet computer, handheld, smart phone or the like. A user's portable device may or may not be communicatively coupled to the vehicle. for example, it is known to couple a mobile phone to a vehicle head unit for various reasons, utilizing wired or wireless connections.

Predictions of traffic control signal status and or changes may be displayed for a user on a vehicle dashboard, head unit display screen, auxiliary display unit, or the display screen of the user's portable wireless device, such as a tablet computer, handheld, smart phone or the like. As an example, a prediction that a yellow light is going to turn red in two seconds may be provided to a driver and/or to a vehicle that is approaching the subject intersection. One aspect of this disclosure is directed to the use of control emulation to generate this type of short-term prediction.

Figure 5:
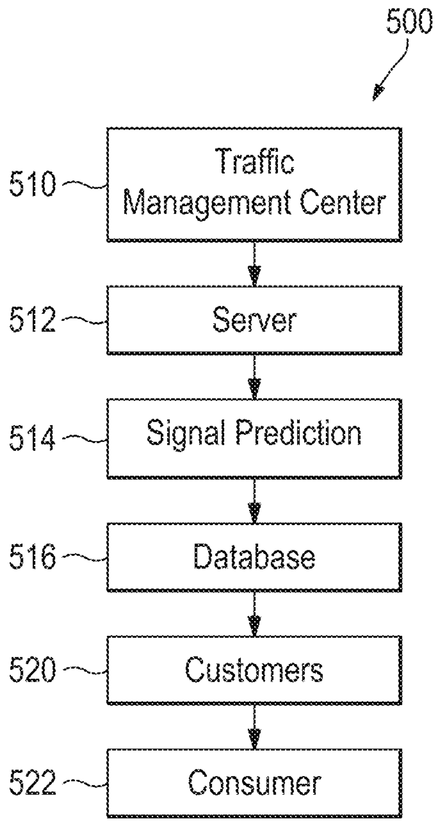
FIG. 5 is a simplified high-level diagram showing information flow in some embodiments and applications of the present disclosure.

FIG. 5 is a simplified introductory diagram showing information flow 500 in some embodiments and applications of the present disclosure. Here, a traffic management center 510 may be deployed, for example, in a city, to provide centralized traffic management functions. In some cases, the traffic management center may communicate data or instructions electronically to individual signal controllers. Conversely, the traffic management center may be arranged to receive information from signal controllers around the city. The individual controllers may provide state data, which may include vehicle call data responsive to detector inputs signals. A server 512 may be configured to store and analyze data received at or provided by the TMC. The server 512 may be arranged to receive and store longer term controller data (defined later), such as vehicle call data, and to generate statistical analyses of such data, as further explained below.

Again referring to FIG. 5, the server may provide data as further described below to be used in a signal prediction feature 514. The signal prediction process in turn generates signal prediction data into a database 516. That database 516 may be made accessible to selected customers 520. For example, such customers may include automobile manufacturers, after-market automotive suppliers, etc. The prediction data in the database may then be communicated electronically to motor vehicles or their operators, also referred to as consumers 522.

Figure 6:
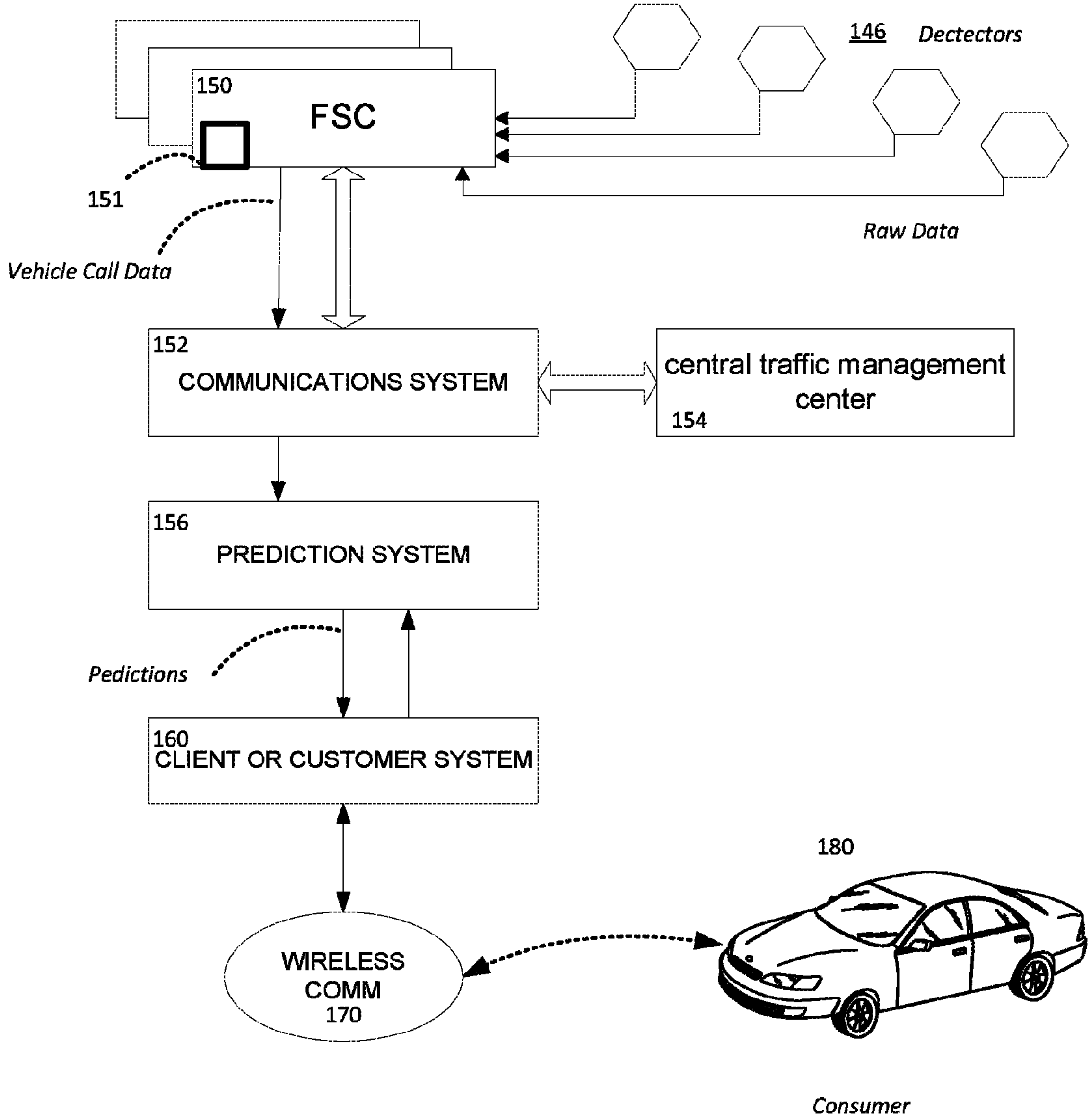
FIG. 6 is a simplified communications diagram of a traffic control prediction system.

FIG. 6 shows an alternative system in more detail. One or more detectors, referenced generally at 146, provide raw data or input signals to an FSC 150. Details of these connections are known. The FSC 150 is often coupled to a communication system 152 operated by local traffic management authorities. The authorities may operate a central traffic management center 154, although some FSC's may operate autonomously. In some embodiments, a prediction system as disclosed herein may obtain data from the central management center, as indicated in FIG. 5. In other embodiments, the prediction system may obtain data solely from the FSC. The FSC 150 receives raw data from the detectors 146 and processes that raw data to generate vehicle call data or "calls." A call may result from, for example, the detected arrival of a car 50 feet behind an intersection limit line, in a particular lane. However, we will use the terms "vehicle call" or "vehicle call data" herein in a broad, generic sense in that any given call may be responsive to any type of vehicle, pedestrian, bicycle or other input stimulus.

The vehicle call data is provided to the prediction system 156. It may be communicated via the communication system 152. Preferably, the same vehicle call data generated by the FSC is provided both to the prediction system 156 and to the central management center 154. In some embodiments, the FSC may have a wireless modem 151 installed to communicate call data wirelessly. It may receive detector data wirelessly as well. The prediction system 156, responsive to received vehicle call data and other parameters, generates predictions of FSC state changes, which may include indicator state changes. The predictions may be communicated to a client or customer 160. For example, the client may be an automobile manufacturer, or an aftermarket product or service vendor. The predictions may be conveyed to the client 160 using a push protocol, a pull protocol, regularly scheduled updates or other variations which, in general, should be arranged to be reasonably timely. In a presently preferred embodiment, a push message is executed once per second. In some embodiments, the client 160 may communicate predictions, or information based on the predictions, via a wireless communication system or network 170, to its customers or consumers 180, typically in a motor vehicle. The prediction system 156 in some embodiments may correspond to the prediction system 100 explained in more detail with regard to FIG. 1.

FIG. 1 is a simplified conceptual diagram of an example of a traffic control prediction system 100. The system comprises a control emulation component or system 102, which may include control logic 110 and local control parameters 112. The local control parameters match those of the actual FSC of interest. The local control parameters may include, for example, timing parameters, cycle time, etc.

In this illustration, the prediction system 100 receives current signal status (observed) as input data 120. The current signal status (real time) may be communicated from the FSC using known protocols. The signal status preferably includes state information and current vehicle call data. The prediction system also receives past signal status (collected) as input data 122. Past signal status data may be collected and processed off-line. For example, such data may be accumulated over several days or weeks. This data may be stored in a database for statistical analysis as further described below.

The prediction system 100 also receives future vehicle call data (Predicted) as input data 140. The future (predicted)

detection data 140 is used to advance the control emulator, while applying the local control parameters, to a new state that reflects what the actual controller state is likely to become in the near future. As discussed below, the emulator can be clocked at a rate faster than real-world time, so that it "gets ahead" of the current state of the actual FSC being emulated. The results of the emulation may comprise a future signal status (predicted signal status), indicated as output data 130. The predicted signal status may be communicated to a vehicle or a vehicle operator, or other user, as further described below.

Figure 2A:
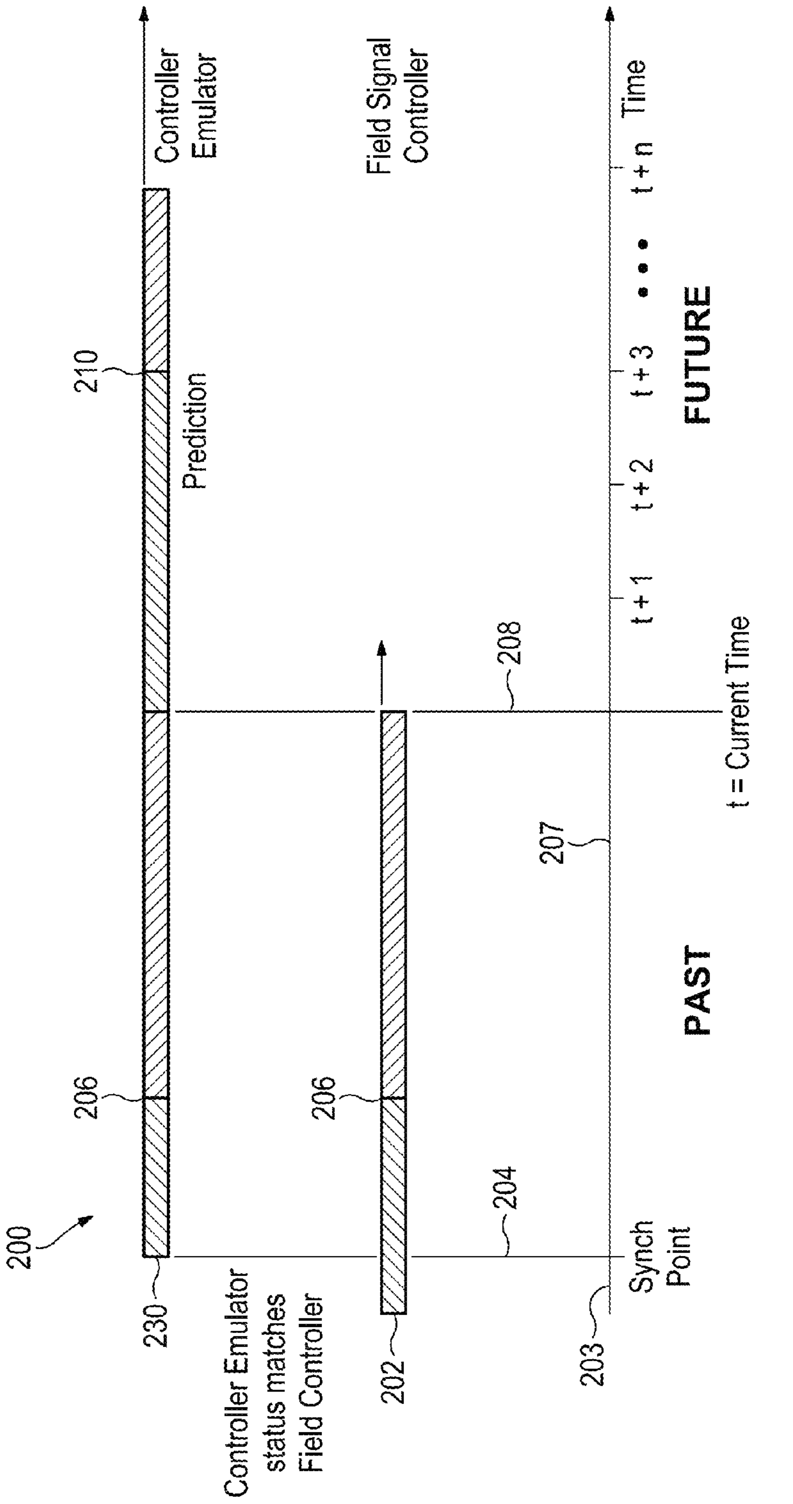
FIG. 2A is a simplified timing diagram illustrating synchronization of a controller emulator process to a field signal controller.

FIG. 2A is a simplified timing diagram illustrating the pertinent timing relationships in greater detail. In the timeline, time is indicated along the bottom axis 200, moving from the past on the left to the future on the right. The actual (real world) current time=t is indicated at vertical line 208. A first bar 202 represents time in the field signal controller, as for example, may be maintained by a local system clock. A second bar 230 represents "time" in the controller emulator (or emulation process).

One challenge presented is to synchronize a state of the controller emulator to the current state of the actual FSC. The difficulty arises because the FSC continues to run, and change state, continuously. It is not practical, and potentially even dangerous, to stop the FSC in order and capture a current state. In order to synchronize state to this "moving target," a process may proceed as follows. First, actual FSC data is collected during a period 203 that is before the point in time marked "Sync Point" 204. An emulator process is initialized to that "old" FSC status to begin. Then, at the sync point in time 204, at least one emulator process is started, and it runs forward from the sync point, up to the current time t and beyond. The emulator "catches up" to the current real-world time t by clocking it at a faster rate. During this time period 207, the emulator process receives call data provided by the FSC responsive to detector inputs or the like. Consequently, the emulator will clock through the same state changes as the actual FSC during this period, up to the current time (t) at 208. Thus the emulator is now fully synchronized to the FSC, at the actual current time.

Starting from the current time t, it remains to predict what the FSC will do in the future. The units are not critical, but intervals of one second are convenient in a presently preferred embodiment. In order to drive the emulator to an expected future state, say a time t+1 or t+3 in FIG. 2, the emulator receives "future detection data" indicated as 140 in FIG. 1. The future detection data may be generated, for example, by a statistical or probability analysis of actual detection data received at the subject FSC in the past. Again, the controller emulator is running in "fast forward" mode.

To simplify, here we discuss only a single detector for illustration. For example, one detector might be an in-ground induction loop that detects the presence of a car. Or, it might be a pedestrian push-button. The raw input signals from the detector are received by the FSC and converted into vehicle call data as noted. That call data may be collected and stored over a data collection period, say two weeks, and analyzed using known statistical analyses. The goal is to analyze past behavior of the FSC to help predict its likely future behavior. The data collection period may vary depending on circumstances, and may be changed to optimize it for a given application. The analysis may show, for example, that there is a 40% likelihood of a given call after 2 seconds; and a 60% likelihood of receiving that call after 3 seconds; and perhaps a 90% likelihood or receiving that call after 4 seconds. Each emulator may be calibrated as to how best use this data. For example, the 60% likelihood may be deemed sufficient to trigger a predicted call at t+3. In another application, it may wait until t+4 when the likelihood is greater. Assuming the predicted (and simulated) call is input to the emulator at time t+3, it will change state accordingly. Assuming no other inputs for simplicity of illustration, the emulator now reflects a state that the real FSC is likely to reflect in the future, namely at time t+3. Thus a prediction at 210 is completed. The prediction is captured and the emulator instance may be terminated.

Figure 2B:
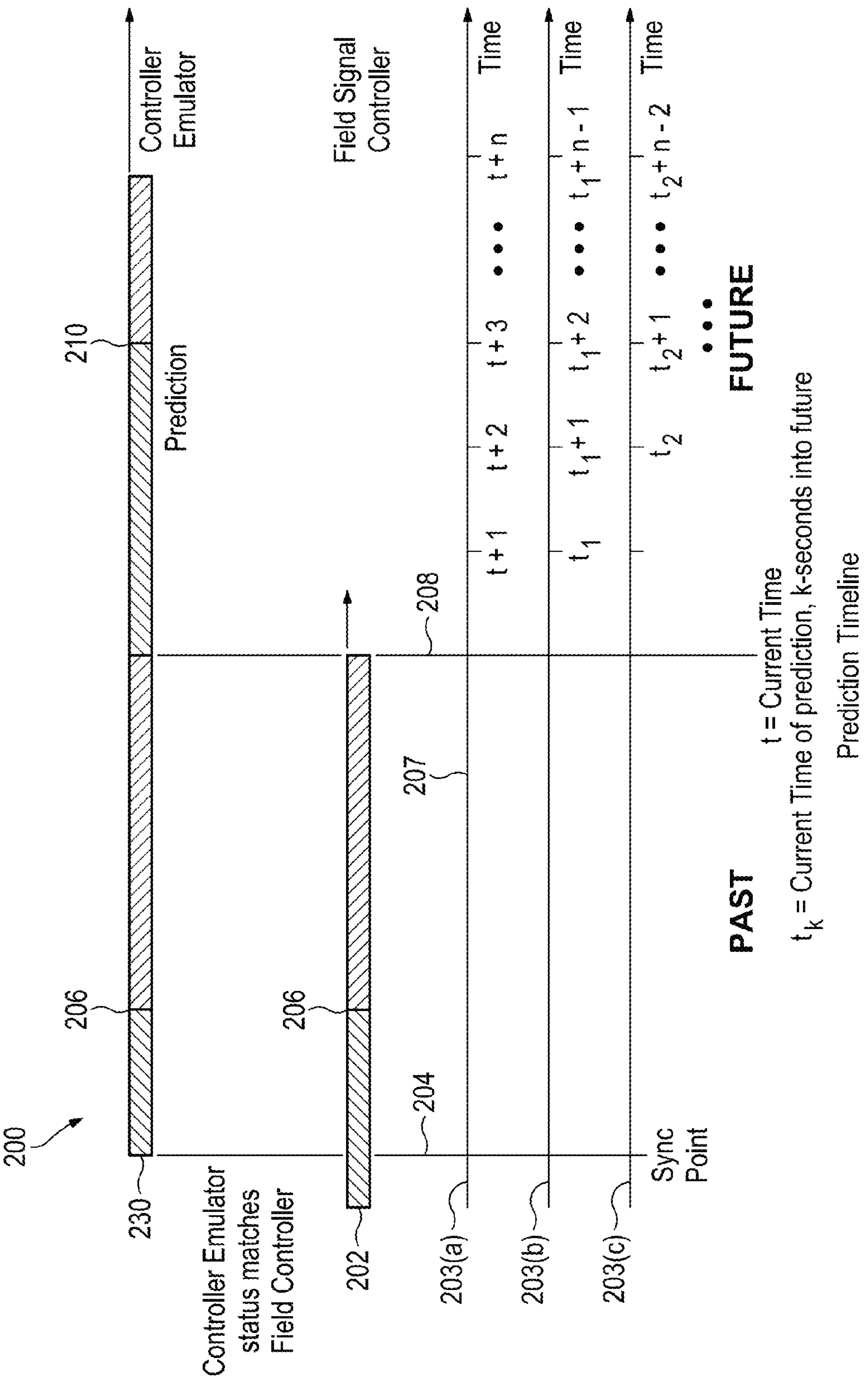
FIG. 2B is an augmented version of FIG. 2A illustrating a series of staged future predictions.

FIG. 2B is an augmented version of FIG. 2A illustrating a series of staged future predictions. In this embodiment, after completing a prediction, the results are stored in a buffer or queue to be available for communication to the client. Obtaining the live statuses from an FSC takes time, as does running the emulator. In order to deliver predictions with minimal lag attributed to such tasks, multiple predictions can be made in each emulation step. For example, assume a prediction is made that an indicator light will change from red to green 3 seconds into the future, as indicated at mark 210. In the same emulation step, we would find that barring unforeseen changes to the live system, 1 second into the future, the emulator would predict a change to occur in 2 s. In 2 seconds into the future, the emulator would predict a change in 1 s. Delivering all three of these predictions to the buffer or queue will result in multiple predictions with respect to the same time, t, even before we reach that time, t, by the emulator. Thus, if there is lag when obtaining the signal statuses and/or performing the emulation, it can be absorbed by the most recent prediction along one of the future tracks (203(*b*), 203(*c*), etc) which pertains to the same base time, t. These results may be more reliable than alternatives, such as automatic time corrections, because the corrections can be derived using the same emulator as the predictions themselves.

Figure 3:
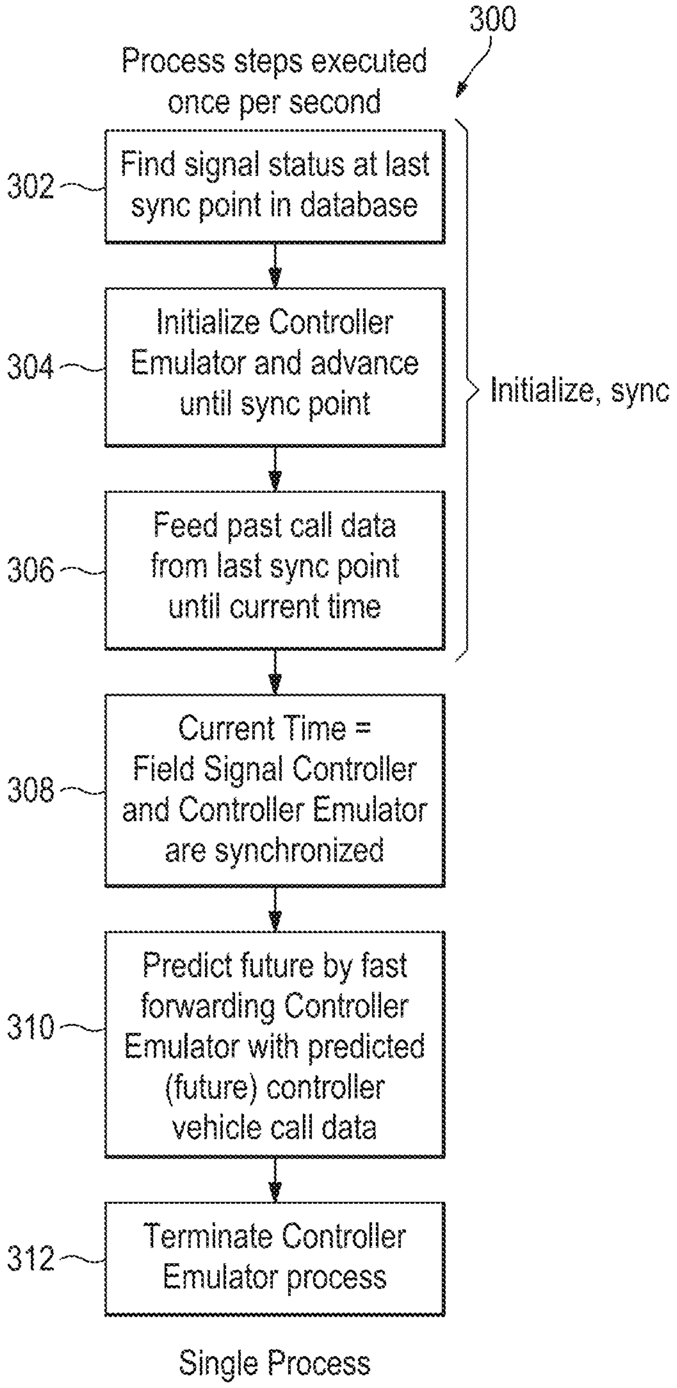
FIG. 3 is a simplified flow diagram illustrating a process for short-term signal status prediction based on a control emulation process.

FIG. 3 is a simplified flow diagram illustrating one emulation method 300 of the type described above, utilizing a single emulator process. Here, we use the term "process" to refer to a computer software process, thread, or the like. In a preferred embodiment, the following process steps may be executed once per second. At block 302, the method calls for finding signal status at a last sync point in a database. At block 304, a controller emulator is initialized and advanced to that last sync point. And at block 306, the method calls for feeding past call data into the emulation, from the last sync point, until the current time t. As noted with regard to FIG. 2, at this time t the emulator is synchronized to the subject FSC, as noted in block 308.

At block 310, the likely future FSC behavior is predicted by fast forwarding the controller emulator, using predicted (future) detection data. The predicted state change may be saved and/or exported, as noted above. At block 312, we terminate the controller emulator process. In some embodiments, the same emulator process may then be re-initialized and run again, in the same fashion as above. Or a new instance may be spawned. On the next operation, and each subsequent run, the process is re-initialized to a more recent sync point.

Figure 7:
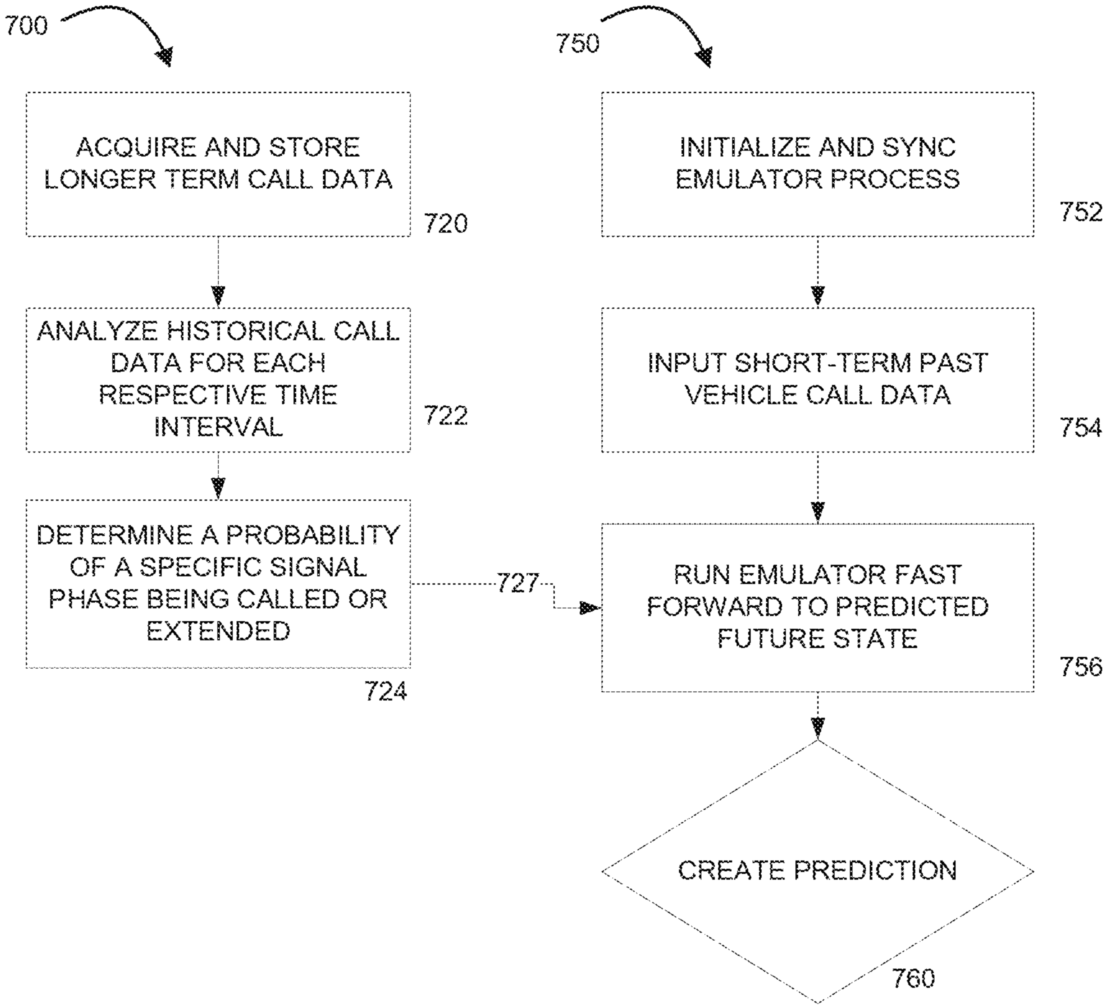
FIG. 7 is a simplified flow diagram illustrating a process for traffic signal predictions utilizing a combination of statistical analysis of historical signal call data, combined with emulation process results.

FIG. 7 is another simplified flow diagram illustrating a process for traffic signal predictions utilizing a combination of statistical analysis of historical signal call data, combined with emulation process results. On the left side of diagram indicated at 700, block 720, we acquire and store longer term signal call data. "Longer term" here refers to multiple days, typically, or even several weeks. These magnitudes of time, and preferably two weeks, have been found suitable for some applications. Next, block 722, the historical data is analyzed for selected time intervals. The time intervals may be for example, 15 minutes, or an hour or two, or a day, or a number of cycle times. The statistical analyses may also include variables for time of day, calendar date, time of year, holidays, etc. The process may determine, at block 724, a probability of a specific signal phase being called or extended. In some embodiments, historical analysis may be done offline, or in a process or processor separate from the controller emulator process.

An emulator process may be initialized and synchronized, block 752. For example, an emulator process may be synchronized to a sync point as discussed. Next, current vehicle call data may be input to the emulator process, block 754. For example, "short-term past" may correspond to the time period 207 in FIG. 2A, between a sync point and the current time t. The emulator is run "fast forward" block 756 and during that time it receives and processes both the actual call data 754 and the predicted call data via path 727 from process block 724. The emulator creates 760 a prediction of what state change will occur in a corresponding field signal controller, and when.

In some embodiments, a method may include repeating the foregoing steps at a rate of once per second, so as to enable updating the predicted signal status once per second. In some embodiments, field detection data may be received as signal phase data for input to the emulator. In some embodiments, the current state of the emulator includes indicator phase displays (e.g., red, yellow, green, walk, flashing don't walk), and active timers (e.g., minimum green, yellow clearance, red clearance, pedestrian walk, pedestrian clearance, etc.)

The predicted signal status may be forwarded or communicated to a vehicle/driver who may be approaching the subject traffic signal. In an embodiment, a motor vehicle may be equipped with suitable equipment to receive that prediction data, and convey it to a control system and/or a passenger or driver of the vehicle. In one embodiment, prediction data may be displayed on the dashboard; in another embodiment it may be displayed on a head unit or navigation unit display screen. The "navigation unit" may be standalone, or implemented as an "app" on a mobile device.

Figure 9:
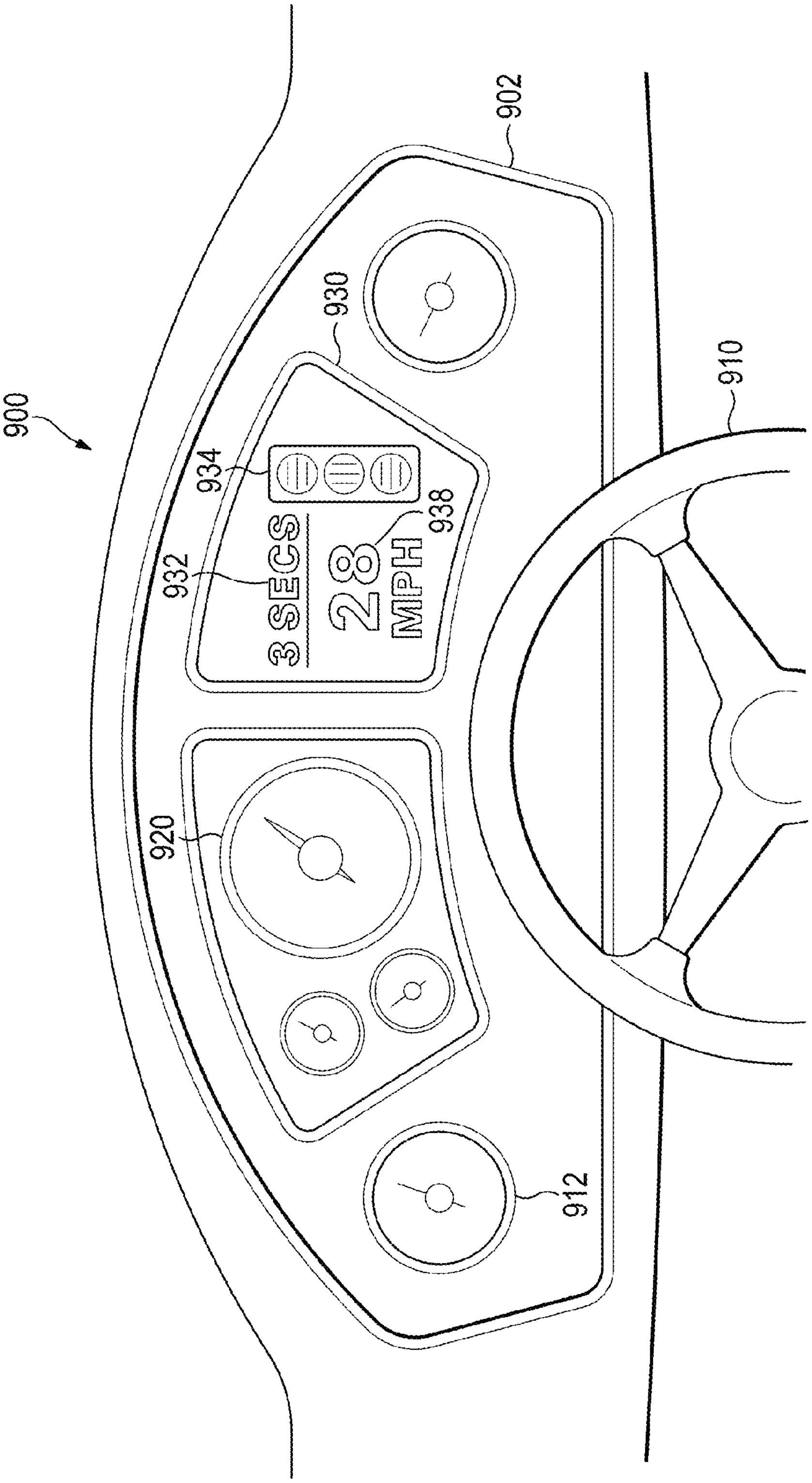
FIG. 9 shows an example of a traffic signal prediction display in a vehicle dashboard.

FIG. 9 shows an example of a traffic signal prediction display (930) in a vehicle dashboard. In FIG. 9, a vehicle dashboard is indicated generally at 900. Dashboard 900 may include an instrument panel 902, comprising various gauges or instruments 912, and typically a speedometer 920. A steering wheel 910 is shown (in part) for context. A traffic signal prediction display 930 in this example may comprise a time display 932 ("3 SECS") and a signal display 934. For example, the signal display 934 may comprise three light indicators. They may be red, yellow and green, and they may be arranged like the signal lights in a typical intersection traffic control signal.

It is not critical, however, that the light indicators be arranged in that manner, or that colored lights are used at all. Various visual display arrangements other than this example may be used; and indeed, audible signaling (not shown) may be used as an alternative, or in addition to, a visual display. The essential feature is to convey some traffic signal prediction information to a user. For example, in FIG. 9, the time display 932 may indicate a number of seconds remaining until the traffic signal that the vehicle is approaching is expected to change state, say from yellow to red. In some embodiments, the traffic signal prediction display 930 may include a speed indicator 938 ("28 MPH"). This may be used to indicate a speed calculated for the vehicle to reach the next signal while it is in the green state.

Having knowledge of what an upcoming traffic signal is going to do in the near future can be used to save gas, save time, and reduce driver stress. For example, when the wait at a red light is going to be relatively long, the driver or an on-board control system may turn off the engine to save fuel. And the prediction system will alert the driver in advance of the light changing to green, to enable a timely restart of the engine. Or, a driver or control system may adjust speed to arrive at a green light. Travel time may be saved by routing optimizations that are responsive to anticipated traffic signal delays. Toward that end, the database prediction data may be provided to a mapping application. Stress is reduced as a driver need not continuously stare at a red signal light, waiting for it to change. In fact, if the wait is known to be long, the driver may want to check her email or safely send a message.

Alternative Embodiments

Instead of using only one emulation process to do the prediction, in another embodiment we use one separate process for each cycle second. That way, we don't have to go back in time to the sync point to resynchronize the emulator before being able to play forward every time step. Instead, in one embodiment, we start up as many emulation processes as there are cycle seconds at the synch point. We keep them all synchronized every time step, and then use one of them to play forward and predict for every time step as we move through the cycle second (after which we discard the process). This approach significantly reduces the computation and real-time data storage burdens as we no longer have to keep track of vehicle call data in real-time between sync point and current time. Instead, we have many more, but less computing-intense processes, which is preferable for a cloud computing environment.

Figure 4:
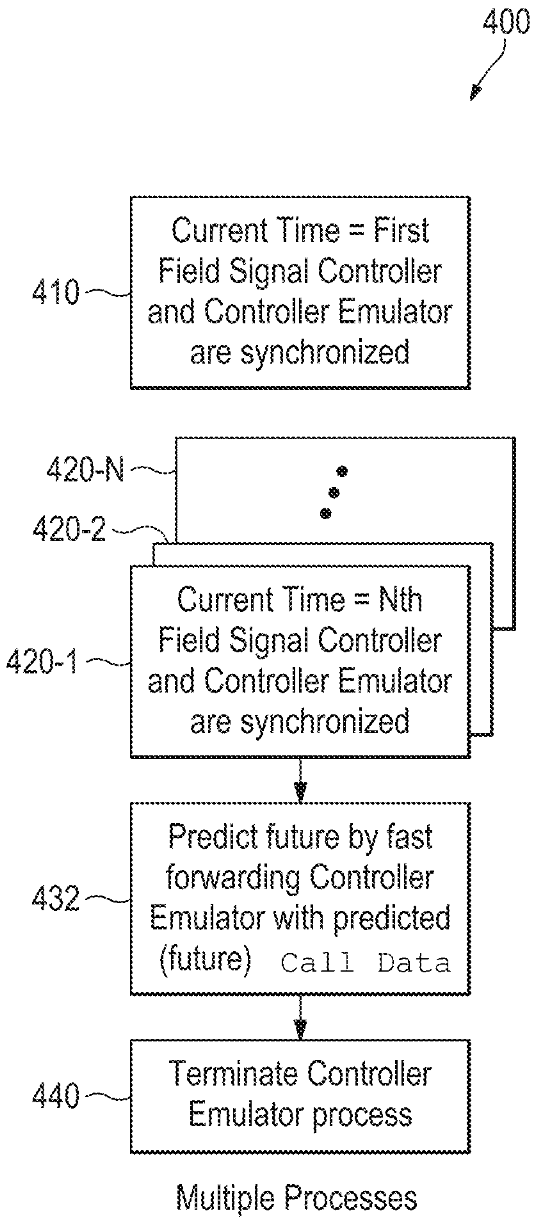
FIG. 4 is a simplified flow diagram of an alternative process for short-term signal status prediction based on using a plurality of control emulation processes.

FIG. 4 is a simplified flow diagram of an alternative process 400 for short-term signal status prediction, utilizing a plurality of control emulation processes. Process steps may be executed periodically, for example, once per second, although this interval is not critical. A first controller emulator (or controller emulator process) 420-1 is synchronized to the field controller, block 410, thereby establishing an initial "Current Time." Similarly, a second controller emulator 420-2 also is synchronized to the field controller, so that the second emulator also is synchronized to the "Current Time." In like manner, additional controller emulator processes may be synchronized to the same Current Time, as indicated by 420-N. After all relevant emulator processes have been initialized and synchronized, all of them commence execution responsive a common clock signal, and thereby remain synchronized.

Subsequently, at block 432, we "fast forward" all of the controller emulator instances to predict future control signal state changes, using predicted (future) call data. Each emulator instance may be terminated at a selected time "in the future." For example, in FIG. 2A, a prediction is concluded at a future time "t+3" indicated at 210. That emulator instance is then terminated, block 440. However, the remaining instances continue to run, as explained with regard to FIG. 8.

Figure 8:
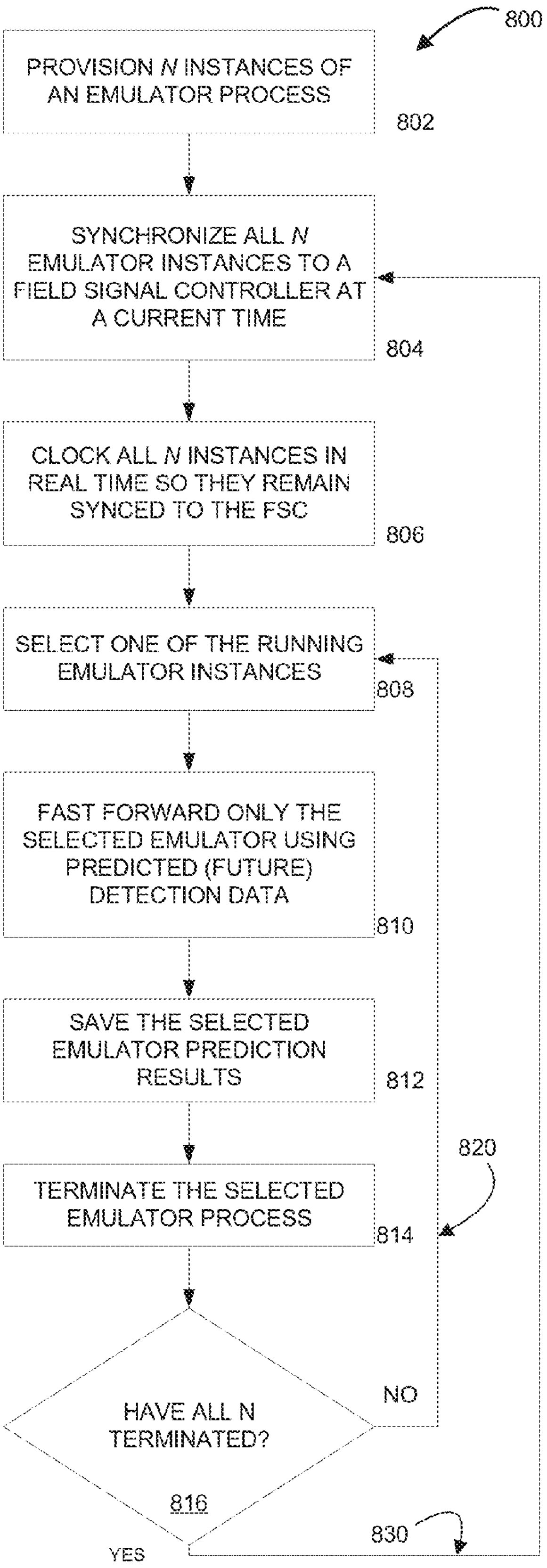
FIG. 8 is a simplified flow diagram of an alternative emulation process that utilizes a plurality of emulator instances, all advancing from a common synchronization state.

FIG. 8 provides a simplified flow diagram 800 of a multiple-emulator embodiment. Preferably each emulator may be an instance of suitable code. At block 802 we provision N instances of an emulator process, where N is an integer on the order of approximately 10-40, although this number is not critical. At block 804, all N instances are synchronized to the same field signal controller at a current time. Methods for doing so are described above. Next, at block 806, we clock all N instances in real time, so that all of them remain actually synchronized to the field signal controller. To remain fully synchronized, the instances also receive real-time detector calls; the same inputs as provided to the FSC.

Next, at block 808, the system selects one of the running emulator instances, and then, block 810, "fast forwards" only the one selected instance, typically by applying a faster clock than the real-time clock. During the fast forward process, predicted future detection data is input to the instance, as discussed above. In one embodiment, the selected instance performs this prediction over a one-second interval.

At the end of that prediction, block 812, the system saves the selected emulator prediction results. For a first selected emulator, this would provide t+1 second prediction results. Then the selected emulator process (only one) is terminated, block 814. Note that meanwhile the other N−1 instances have continued, under real-time clocking, to remain synchronized to the field signal controller, so they are ready to go "fast forward" from their current state. Decision 816 determines whether all N instances have terminated. If not, the process continues via path 820 back to block 808, and selects a second one of the remaining emulators. The second selected emulator instance, only, is then "fast forwarded" as described above with regard to block 810 and the process continues as before using the second selected emulator instance to perform a second prediction. The second prediction may be for time t+2. This same loop 820 is then repeated again for each of the remaining N−2 instances, so that each instance provides a prediction at a time in the future. So, for example, 50 instances might be provisioned to predict signal changes 50 seconds into the future.

Decision 816 detects when all N instances have terminated. The process then loops via path 830 back to block 804 whereupon all N instances are synchronized anew to the new current time t. The process continues to repeat as described so as to continually provide predictions of field controller state.

One of skill in the art will recognize that the concepts taught herein can be tailored to a particular application in many other ways. In particular, those skilled in the art will recognize that the illustrated examples are but one of many alternative implementations that will become apparent upon reading this disclosure. It will be obvious to those having skill in the art that many changes may be made to the details of the above-described embodiments without departing from the underlying principles of the invention.

The scope of the present invention should, therefore, be determined only by the following claims.

The invention claimed is:

1. A computer-implemented traffic signal control emulation method comprising:

provisioning a digital processor for executing a computer software emulator process;

loading and executing a computer software emulator process in the processor to emulate operation of a field traffic signal controller (FSC) at a physical location and its associated timing parameters;

acquiring call data and signal status data provided by the FSC responsive to detector inputs to the FSC during a selected collection period, and storing the acquired call data in a database accessible to the processor;

identifying a signal status at a last sync point of the FSC in the database;

in the processor, initializing the emulator process to an initial state;

in the processor, advancing the emulator process from the initial state to a second state, the second state corresponding to the last sync point of the FSC;

in the processor, further advancing the emulator process from the second state, based on the acquired call data for a time period from the last sync point to a current time, so that at the current time the FSC and the emulator process are synchronized to a current time state;

predicting future detection data for the FSC based on a statistical analysis of a stored collection of long-term past field detection data acquired solely from the FSC;

providing for the emulator process to access the predicted future detection data;

in the processor, fast forwarding the emulator process from the current time state, based on the predicted future detection data;

terminating the emulator process at a future time state;

predicting a signal status based on the future time state of the emulator; and communicating a result based on the predicted signal status to a vehicle or a vehicle operator.

2. The method of claim 1 including advancing the emulator process responsive to a clock signal.

3. The method of claim 1 and further comprising repeating the foregoing steps within a selected time frame.

4. The method of claim 2 wherein each state of the emulator is substantially aligned to the clock signal.

5. The method of claim 2 wherein the clock signal has a period of one second.

6. The method of claim 1 and further comprising repeating the foregoing steps at a rate of once per second, to enable updating the predicted signal status once per second.

7. The method of claim 1 wherein the field detection data is received as signal phase call data for input to the emulator process.

8. The method of claim 1 wherein a state of the emulator process includes traffic signal phase displays, and current values of at least one active timer.

9. The method of claim 1 wherein the physical location is a signalized intersection.

10. The method of claim 1 wherein the digital processor for executing the computer software emulator process is provisioned in a cloud computing environment.

11. The method of claim 1 wherein the call data is provided by a local traffic control agency in the form of signal phase call data.

12. The method of claim 1 including storing received signal phase call data in a database and analyzing the stored data for each one of a plurality of time periods over multiple days to determine an expected pattern of phase detection.

13. The method of claim 12 wherein the time periods are substantially equal in length.

14. The method of claim 13 wherein the time period is selected to exceed a cycle time of the signaled physical location.

15. The method of claim 1 and further comprising re-synchronizing the emulator to a subsequent sync point of the FSC preparatory to a new emulation operation.

16. The method of claim 1 wherein the emulator process comprises an instance of a control program implemented in the FSC, and its associated timing parameters.

17. The method of claim 1 including using a local traffic control agency's communication infrastructure to poll the FSC directly.

18. The method of claim 1 including receiving the short-term past field detection data in a feed from the actual signal controller.

19. The method of claim 1 including receiving the short-term past field detection data from a database that a local traffic control agency maintains at their control center.

20. A traffic control emulation system comprising:

a digital processor for executing a computer software emulator process;

the digital processor coupled to a communication system to acquire signal status data and call data provided by a field traffic signal controller (FSC) responsive to detector inputs to the FSC during a selected collection period;

a database system accessible to the digital processor and configured to store the acquired signal status data and call data over time so as to form past detection data;

a memory coupled to the processor and storing a set of machine-readable instructions configured to implement a computer software emulator process;

a source of predicted future call data accessible to the processor, the predicted future call data based on statistical analysis of the past detection data;

wherein the stored instructions are arranged to cause the processor, when executed, to— identify a signal status at a last sync point of the FSC;

initialize the computer software emulator process to an initial state;

advance the computer software emulator software process from the initial state to a second state, the second state corresponding to the last sync point of the FSC;

further advance the computer software emulator process from the second state, based on the acquired call data for a time period from the last sync point to a current time, so that at the current time the FSC and the emulator process are synchronized to a current time state;

predict future detection data for the FSC based on a statistical analysis of a stored collection of long-term past field detection data acquired solely from the FSC, and store the predicted future detection data in the memory;

fast forward the emulator process from the current time state, based on the predicted future detection data;

terminate the emulator process at a future time state;

predict a signal status based on the future time state of the emulator process; and communicate the predicted signal status to a vehicle or vehicle operator.

21. A computer-implemented traffic signal control emulation method comprising:

provisioning a digital processor for executing a computer software emulator process;

loading and executing a computer software emulator process in the processor to emulate operation of a field traffic signal controller (FSC) at a physical location and its associated timing parameters;

acquiring call data and signal status data provided by the FSC responsive to detector inputs to the FSC during a selected collection period, and storing the acquired call data in a database accessible to the processor;

predicting and storing future detection data for the FSC, wherein the future detection data is based on a statistical analysis of past detection data of the FSC;

provisioning and starting n instances of the computer software emulator process;

synchronizing each of the n emulator process instances to the FSC at a current time;

advancing each of the n instances in real time so they remain synchronized with the field signal controller;

selecting one of the n emulator instances;

fast-forwarding only the selected emulator instance using the predicted future detection data as input data to generate a corresponding emulator instance prediction of a state of the field signal controller at a time in the future;

saving the selected emulator instance prediction results;

terminating the selected emulator process;

communicating the emulator instance prediction to a vehicle or a vehicle operator; and in the case that all n instances have not terminated, repeating the above selecting, fast-forwarding, saving, terminating and communicating steps for a next one of the n emulator instances.

22. The method of 21 and further comprising repeating the foregoing steps until all of the n instances of an emulator process are terminated.

23. The method of 22 and then re-synchronizing all n instances of the emulator to the field signal controller.

24. The method of 21 wherein the number n is equal to the number of seconds per cycle of the signal controller.

25. The method of 21 and further comprising communicating selected emulator instance prediction results to a mobile device.

26. The method of 21 and further comprising communicating selected emulator instance prediction results to a motor vehicle on-board system.

27. The method of 21 and further comprising communicating selected emulator instance prediction results to a motor vehicle for display on a dashboard.

28. The method of 21 and further comprising communicating selected emulator instance prediction results to a motor vehicle head unit.

* * * * *